Sept. 21, 1965     E. JORDAN     3,207,381
SEED SOWING MACHINES
Filed March 16, 1964     4 Sheets-Sheet 1

Inventor
Ernst Jordan
By Cushman, Darby & Cushman
Attorneys

Sept. 21, 1965 E. JORDAN 3,207,381
SEED SOWING MACHINES
Filed March 16, 1964 4 Sheets-Sheet 2
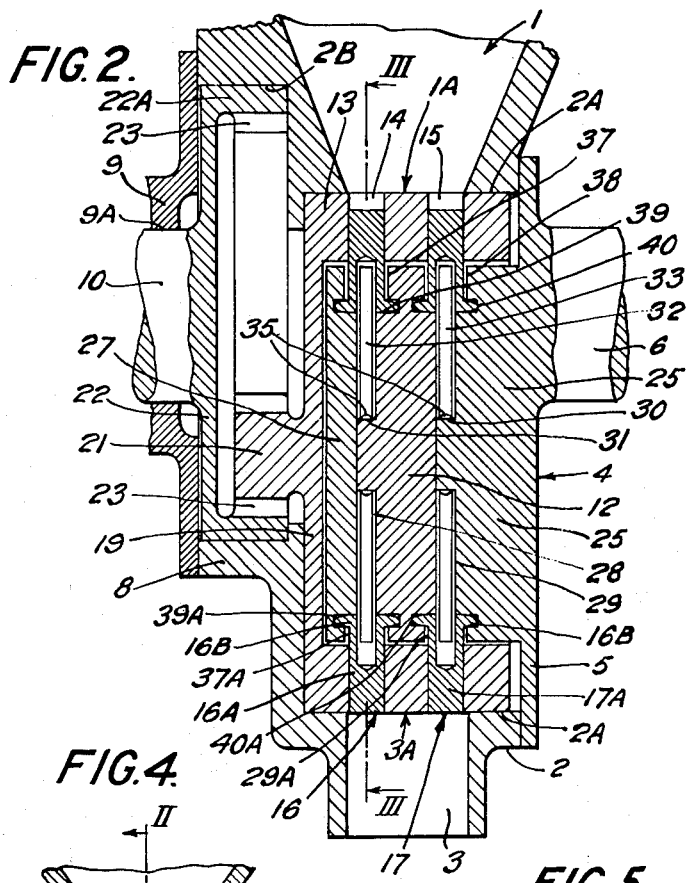
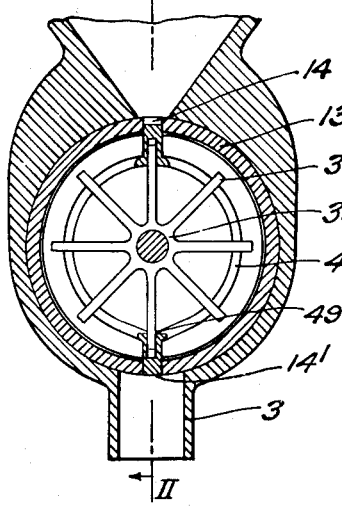
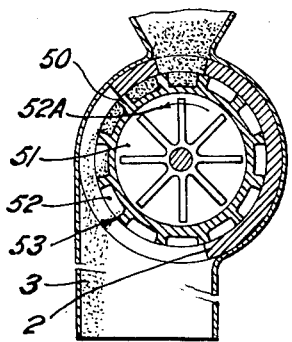
Inventor
Ernst Jordan
By Cushman Darby Cushman
Attorneys

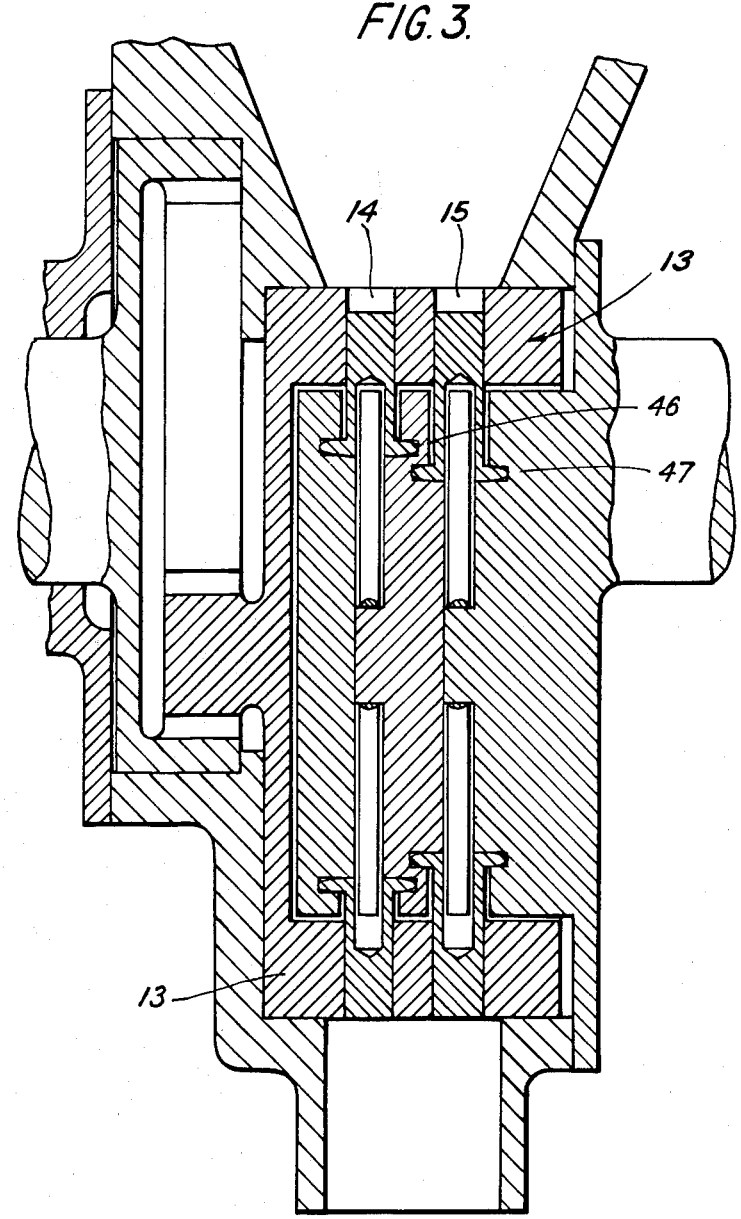

Sept. 21, 1965 E. JORDAN 3,207,381
SEED SOWING MACHINES
Filed March 16, 1964 4 Sheets-Sheet 4
FIG. 6.
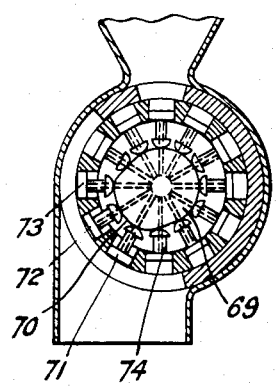
FIG. 7.
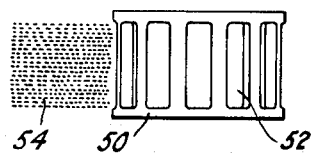
FIG. 8.
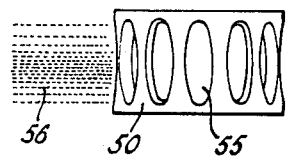
FIG. 9.
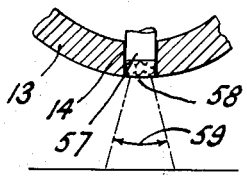
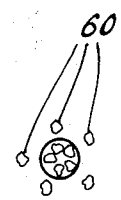
FIG. 10.
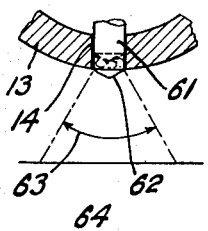
FIG. 11.
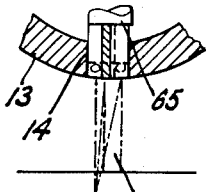
Inventor
Ernst Jordan
By Cushman, Darby & Cushman
Attorneys

United States Patent Office 3,207,381
Patented Sept. 21, 1965

3,207,381
SEED SOWING MACHINES
Ernst Jordan, Leinpfad 17, Hamburg, Germany
Filed Mar. 16, 1964, Ser. No. 352,098
Claims priority, application Germany, Mar. 20, 1963,
J 23,390
13 Claims. (Cl. 222—218)

This invention relates to a seed sowing machine.

Various seed sowing machines are known but, in general, the known machines have the disadvantage that each machine is designed to handle a particular kind of seed. Different kinds of seed require to be sown in different ways, for example, certain seed should be "earthed up" and others may have to be dribbled. Further, dependent on the kind and nature of the seed it is sometimes necessary to eject seed from the sowing machine or simply to allow the seed to fall from the machine under gravity.

It is an object of this invention to provide a seed sowing machine which may be used for sowing a variety of seed and according to one aspect of this invention a seed sowing machine comprises a storage container for seed, an ejection duct and a seed sowing unit including a shell having a seed recess opening into the outer periphery thereof, an ejecting member dispaceable within the recess, a core relatively rotatable within the shell and having guide means for displacing the ejecting member according to the said relative rotation and means for producing the said relative rotation whereby seed collected from the container in the recess is carried to the ejection duct where the ejecting member is displaced by the guide means to expel seed from the recess into the ejection duct for sowing.

The invention also includes a seed sowing machine comprising a storage container for seed, an ejection duct and a seed sowing unit operable during movement of the machine for sowing to transfer seed from the container to the ejection duct, the seed sowing unit including a removable shell having a circumferential row of seed recesses opening into the outer periphery thereof, an ejecting member displaceable within each recess, a core relatively rotatable within the shell and having guide means for displacing the ejecting members according to the said relative rotation which is dependent on movement of the machine during sowing whereby seed collected from the container in the recesses is carried to the ejection duct where the appropriate ejecting member is displaced by the guide means to expel seed from a recess into the ejection duct for sowing. Preferably, the core has a concentric bearing surface on which a spider is freely rotatable, the spider having radial spokes on which the ejection members are respectively slidable during displacement.

In one form of machine according to the invention the core is divided into at least two disc-like members between which the spider is disposed on a concentric bearing surface formed on one of the said members. The adjacent surfaces of the disc-like members may have annular grooves which form when assembled an eccentric cam groove of T cross-section constituting the guide means for displacing the ejecting members, each ejecting member having a head cooperable with the groove so that during the said relative rotation between the core and the shell the ejecting members follow the cam groove to effect displacement in the seed recesses. It will therefore be understood that movement of the ejecting members is controlled in two ways viz.: (i) a sliding movement of the heads of the ejecting members in the eccentric cam groove and (ii) sliding movement of the ejection members on the spokes of the spiders. The last mentioned sliding movement affords particular support to the ejection members during displacements within the recesses. The eccentric cam groove constituting the guide means for the ejecting members may be shaped to urge one or more ejecting members into a position to expel seed as may be required. Where it is required to displace only one ejecting member at one time, the cam groove has a projecting portion with steep flanks. When following such flanks the head of the ejecting member would normally tend to cant but canting is prevented since the movement of the member is controlled by a radial spoke on the spider. The spokes are made sufficiently long to always provide guides for the ejecting members throughout their range of displacement. Preferably the eccentric cam guide groove has a profile so that at least three successive ejection members are displaced into the position to expel seed substantially simultaneously. Seed will therefore be ejected from the machine in greater quantities than where one recess alone is used and different degrees of seed scatter can be obtained by shaping the operative ends of the ejection members. It will be appreciated that guidance of the ejecting members on the spokes is particularly important where three members are simultaneously displaced since the profile of the eccentric cam slide has a steep ascent heading to the ejecting position.

Further, in order to reduce friction and the possibility of the heads of the ejecting members jamming within the cam groove, the heads are shaped with opposite surface convexly curved.

In one form of machine the shell includes at least two circumferential rows of seed recesses each row of recesses having associated eccentric cam grooves, spiders and ejecting members and the eccentric cam grooves are staggered so that those portions of the grooves in which the heads of the ejecting members are cooperable overlap thereby reducing the axial distance between adjacent circumferential rows of recesses.

A simple construction of the seed-sowing machine is achieved by the fact that the core is a part of the stationary casing and only the shell is rotatably driven of the sowing box so that the spiders are cogged in the concentric slide way.

According to another embodiment of the present invention the spokes of the spider serve to fix the shell of the sowing box in an interchangeable and rotatable way to the core in which case the shell bears on its surface recesses which open into the outer periphery of the shell and are provided with a base.

It is advantageous to make the recesses elongated in the axial direction of the sowing unit and to extend to cover two or more adjacent ejecting members. Several different characteristics of seed sowing are obtainable when the recesses, being of oblong form in axial direction of the sowing box, are broader and/or deeper their central region than at their ends so that a different density of the flow of seeds is obtained.

The operative ends of the ejecting members may as indicated above be shaped according to the degree of seed scatter required, for example, the ejecting member may be pointed, flat, shaped to include a number of pockets or have a number of projections to loosen seed during expulsion.

A seed sowing machine in accordance with this invention will now be particularly described by way of example with reference to the accompanying drawings in which:

FIGURE 1 is a front view of the machine;
FIGURE 2 shows a part section of the machine along line II—II of FIGURE 4;
FIGURE 3 is a similar section to FIGURE 2;
FIGURE 4 is a section taken on line III—III of FIGURE 2;

FIGURE 5 is a section similar to FIGURE 4 showing another embodiment of machine;

FIGURE 6 is a section similar to FIGURE 4 showing a still further embodiment of machine;

FIGURES 7 and 8 show two forms of shell for use with the machine, and

FIGURES 9, 10 and 11 show three forms of seed ejecting tappet heads for producing different seed spread.

Figure 1:
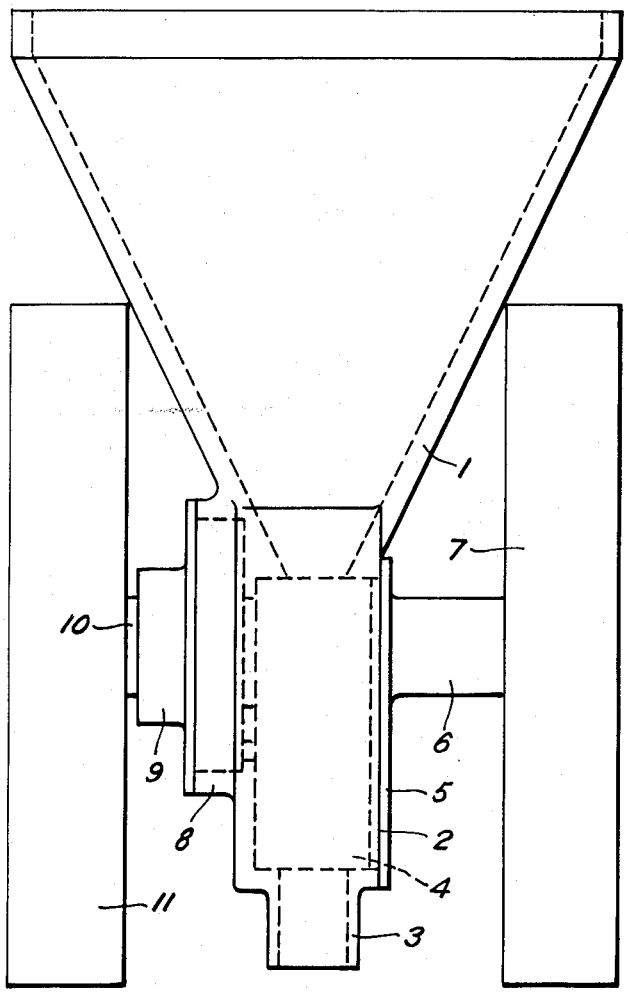

One form of wheeled seed sowing machine is illustrated in FIGURES 1 and 2 and includes a hopper 1 which can be formed integrally with a housing 2 for a rotatable seed sowing unit 4. The housing 2 has a cylindrical bore 2A in connection with the hopper 1 and a seed ejection duct 3 through apertures 1A and 3A respectively. The cylindrical bore 2A is open at one side, namely the right-hand side in FIGURE 2, whereas the left-hand side of the bore opens into a cylindrical recess 2B which is eccentric with respect to the bore 2A.

The seed sowing unit 4 is driven as later described by rotation of wheel 11 as the machine traverses the ground, whereas a second wheel 7 is freely rotatable on an axle 6. The seed sowing unit 4 comprises the following major components:

(i) A cylindrical shell 13 rotatable in the cylindrical bore 2A of the housing. The shell 13 has an integral end plate 19 and a coaxial pinion 21. In the machine of FIGURES 1 and 2 two circumferential rows of openings 14, 15 are formed in the shell and as later described seeds are carried from the hopper 1 to the ejection duct 3 in these holes.

(ii) A circular core 12 has an annular rebate 28 with a concentric shoulder 31. The rebate 28 is stepped to form a second rebate 37 and between these two rebates there is formed a cam groove 39 as shown in FIGURE 2.

(iii) A circular plate 27 is formed with a rebate 37A and a cam groove 39A corresponding to the rebate 37 and cam groove 39 respectively in the circular core 12 so that when assembled the corresponding grooves and rebates form a T sectioned and peripheral slot in which tappets 16 are supported as later described.

(iv) A circular plate 5 having a concentric boss 25 is integral with the axle 6 and a rebate 29 having a concentric shoulder 30 similar to rebate 28, is formed in the boss as shown in FIGURE 2. The rebate 29 is stepped to form another rebate 38 and a cam groove 40 separates the two rebates. The core 12 is also formed with a rebate 29A and a cam groove 40A so that when assembled as shown in FIGURE 2, the corresponding rebates and grooves form a peripheral and T sectioned slot in which tappets 17 are supported as later described. As shown in FIGURES 2 and 4 the cam grooves 39, 39A and 40, 40A are eccentric with respect to the cylindrical shell 13.

(v) Within the rebates 28, 29 which, together with adjacent surfaces of the discs 27 and the core 12 respectively form circumferential grooves opening into the T sectioned slots, there are mounted spiders 32 and 33 respectively. The spiders 32, 33 have hubs 35 bored for rotation on the appropriate concentric shoulders 30, 31 and a number of radially extending spokes as shown more clearly in FIGURE 4. The ends of the spokes, see reference 36 in FIGURE 4, form pivots on which tappets 16, 17 (FIGURE 2) located in the circumferential rows of holes 14, 15 are supported. The tappets 16, 17 have shanks 16A, 17A, bored to receive the spokes and disc-like heads 16B, 17B with opposite surfaces convexly curved in order as later described, to reduce frictional resistance during relative sliding movement of the tappets in the cam grooves. The tappet shanks 16A, 17A are bored to give a clearance for the ends of the spokes 36 so that, in operation, pockets of air contained in the bores readily escapes through the clearances and do not act as cushions which would otherwise restrain movement of the tappets.

From FIGURES 2 and 4 it will be seen that, when the core 12 and circular plates 27 and 5 move together within the cylindrical shell 13, movement of the tappets is controlled by (a) sliding movement of the tappet heads 16B, 17B in the cam grooves 39, 39A, and 40, 40A respectively and (b) sliding movement of the tappet shanks on the radial spokes of the spiders.

The core 12 and circular plates 27, 5 are assembled and locked together by a central fixing screw (not shown) for rotation with a clearance inside the shell 13.

The wheel 11 is keyed to an axle 10 which carries at its right-hand end, see FIGURE 2, a circular disc 22 having a circular ring 22A formed with internal ring gear teeth 23. The circular ring 22A is rotatable within the cylindrical recess 2B and the gear teeth 23 mesh with the pinion 21. A cover plate 9 is secured to the housing 2 and a bearing surface 9A serves, together with co-operation between the ring 22A and the cylindrical recess 2B, to support the axle 10.

In operation, seed from the seed hopper 1 falls by gravity into the holes 14, 15 formed in the cylindrical shell 13 and, when the machine is moved over ground to be sown with the seed, the wheel 11 is turned thereby imparting rotary movement to the shell 13 via the internal gear 23 and pinion 21. The other wheel 7, being freely rotatable on the axle 6 serves to provide additional support for the machine. During rotation of the shell 13, seeds in the openings 14, 15 are entrapped by the bore 2A of the housing, until the openings are successively moved into communication with the ejection duct 3. In the embodiment of FIGURES 1, 2 and 4 the cam grooves 39, 39A and 40, 40A are such that, when a particular opening 14, 15 is in line with the centre line of the ejection, the appropriate tappet has been moved into the position of the tappets 16, 17 at the bottom of FIGURE 2 to eject the seed from the openings.

FIGURE 3 shows an embodiment of a machine similar to the one shown in FIGURE 2 but with a type of seed sowing unit 4 which is shorter in axial dimension. This decrease in axial dimension is permitted by forming cam grooves (corresponding to 39, 39A and 40, 40A in FIGURE 2) as different radii from the axis of rotation of the cylindrical shell 13 so that tappet heads 46, 47 overlap as shown in FIGURE 3.

FIGURE 4 shows an embodiment in which the cylindrical shell 13 has two diametrically opposed openings 14, 14′ and, consequently, only two of the seven pivots 36 of the spider carry tappets. Further, from FIGURE 4 it will be seen that eccentric cam groove 48 formed by the grooves 39, 39A has a projection 49 directed towards and situated above the seed ejection duct 3. The purpose of the projection 49 is to urge the appropriate tappet towards the ejection duct and thereby secure ejection of seed into the duct 3.

From a comparison of FIGURES 2 and 4 it will be appreciated that the machine affords flexibility in that cylindrical shells 13 with one or more openings 14, 15 can be used as desired with the same basic spider having say, eight spokes. Other forms of spider having a greater number of spokes may also be used in which case the cylindrical shell 13 would be formed with the appropriate number of openings affording greater flexibility. From the above it will be appreciated that the flexibility of the machine to produce different frequencies of seed ejection is not dependent on changing the gearing between pinion 21 and ring gear 23 to change the speed at which an opening 14, 15 passes beneath the hopper since a certain speed should not be exceeded in order to secure a correct filling, but upon changing the number of openings which pass beneath the hopper.

It will also be appreciated that if a cylindrical shell 13 having greater axial length is chosen more than two rows of openings 14, 15 as may be desired can be obtained by employing the appropriate number of plates such as 5, 27 as already described. A machine built according to the invention is adjustable to obtain different distances between rows of seeds by using dummy discs or by providing shells with openings in desired axial distances only. There is the further possibility of covering single circumferential rows of openings by small cover-plates which are inserted into the spout of the hopper as may be desirable.

FIGURE 5 shows another embodiment of the machine having a shell 50 which in its structure resembles shell 13 in FIGURE 2 is disposed over a core 51 which can be made similar to core 4. Since the radial extent of the spokes of the spiders is the same as the radial extent of the core 4 the ends of the spokes permit a clearance with the shell and it is therefore possible to arrange neighbouring openings 52 similar to 14, 15 (FIGURE 2) close to each other. The openings 52 are formed as pockets with a base. According to this embodiment the shell rotates as indicated by arrow 52A and it is clear that a circumferential section 53 of the housing 2 of considerable length is open to the ejection duct 3 so that seeds are spread over a comparatively large area. It is preferred that at least three pockets 52 are in seed ejecting position at the same time. According to this embodiment of machine a row of seeds like a strip or band can be sown.

FIGURE 6 illustrates a machine including a profile cam 69 having a projection 70 of angular extent so that three tappets 71, 72, 73 are displaced into ejection position. As can be seen on the drawing the cam profile has a comparatively steep portion at 74, and consequently the heads of the tappets which are carried on spokes of a spider have part-spherical heads so that they can follow the cam profile without canting. Although the forces acting on the sides on the heads of the tappets which follow the cam are sufficient to result in the tappet heads being jammed in an opening the fact that the tappets are slidable on the radial spokes of a spider avoids this danger. Where openings of size and shape differ from the size and shape of a tappet shank, which is the case in FIGURE 2, are used, members corresponding with the size and shape of the openings are attached to the tappet shanks in order to effect clearance of seed from the openings at the appropriate time.

FIGURES 7 and 8 show different constructions of a shell such as the shell 50. The shell 50 of FIGURE 7 has openings 52 which are basically rectangular and these openings create a seed-row consisting of a strip or band of sown seed with overall uniform density of dispersion. The width of such a band may be enlarged by combining several shells 50. The shell 50 of FIGURE 8 has openings of oval plan 55 which may have a flat base or may be concave so that a seed-row 56 is obtained having a greater density of seed in the centre of the row.

FIGURES 9 to 11 show several possible ways of spreading seed with the help of specially shaped tappets. All the figures show a section of shell 13 with a cylindrical opening 14. Tappet 57 of FIGURE 9 has a plane head 58 which during ejection produces a comparatively narrow angle of dispersion 59 and as indicated below FIGURE 9, the seed from its position within the opening (shown in dotted lines) will be ejected as indicated at 60.

Tappet 61 of FIGURE 10 has a conical tip 62 which results in a wider angle of dispersion 63 during ejection. By this arrangement the seed is ejected over a greater area as indicated at 64.

Tappet 65 of FIGURE 11 has seed pockets 66 at its lower end extending in an axial direction of the tappet. In this arrangement the seeds are ejected when expelled by the tappet to have practically no dispersion so that the seeds 68 are placed on the soil close to each other in a bunch as drawn below FIGURE 11. In place of the seed pockets 66 a series of studs may be used to effect ejection of the seed.

What I claim is:

1. A seed sowing machine comprising a storage container for seed, an ejection duct and a seed sowing unit operable during movement of the machine for sowing to transfer seed from the container to the ejection duct, the seed sowing unit including a removable shell having a circumferential row of seed recesses opening into the outer periphery thereof, an ejecting member displaceable within each recess, a core relatively rotatable within the shell and having guide means for displacing the ejecting members according to the said relative rotation which is dependent on movement of the machine during sowing, said core having a concentric bearing surface on which a spider is freely rotatable, the spider having radial spokes on which the ejecting members are respectively slidable during displacement, and wherein the core is divided into at least two disc-like members between which the spider is disposed on a concentric bearing surface formed on one of the said members, whereby seed collected from the container in the recess is carried to the ejection duct where the appropriate ejecting member is displaced by the guide means to expel seed from a recess into the ejection duct for sowing.

2. A machine according to claim 1 wherein adjacent surfaces of the disc-like members have annular grooves which form when assembled, an eccentric cam groove of T cross-section constituting the guide means for displacing the ejecting members, each ejecting member having a head cooperable with the groove so that during the said relative rotation between the core and the shell the ejecting members follow the cam groove to effect displacement in the seed recesses.

3. A machine according to claim 2 wherein the shell includes at least two circumferential rows of seed recesses each row of recesses having associated eccentric cam grooves, spiders and ejecting members.

4. A machine according to claim 3 wherein the eccentric cam grooves are staggered so that those portions of the grooves in which the heads of the ejecting members are cooperable overlap thereby reducing the axial distance between adjacent circumferential rows of recesses.

5. A machine according to claim 2 in which the eccentric cam groove has a profile whereby at least three successive ejecting members are displaced substantially simultaneously to expel seed into the ejection duct.

6. A seed sowing machine comprising a storage container for seed, an ejection duct, and a seed sowing unit including a rotatable shell which rotates upon movement of the machine, said shell having a seed recess opening into the outer periphery thereof, a core which is stationary relative to the rotatable shell, said core having a concentric bearing surface on which a spider is freely rotatable, an ejecting member displaceable within the recess and guide means on said shell for displacing the ejecting member according to the relative position of said guiding member to said core, said spider having radial spokes on which the ejecting member may slide during displacement, whereby seed collected from the container in the recess is carried to the ejection duct where the ejecting member is displaced by the guide means to expel seed from the recess and into the ejection duct for sowing.

7. A machine according to claim 6 in which the recess opens into the outer periphery of the shell and is closed in the region of the inner periphery of the shell.

8. A machine according to claim 7 wherein the recess is elongated in an axial direction.

9. A machine according to claim 8 wherein the central region of the recess has a greater volume whereby a band of seed is sown with a differing density.

10. A machine according to claim 7 having two wheels of which one is supported from the core and is freely rotatable and the other is connected with the shell through a driving means driven in dependence upon the rotation of said last named wheel during movement of the machine.

11. In a seed sowing machine comprising a storage container for seed, an ejection duct, and a seed sowing unit operable during movement of the machine for sowing to transfer seed from the container to the ejection duct and said seed sowing unit incluuding a removable shell having a circumferential row of seed recesses opening into the outer periphery thereof, an ejecting member displaceable within each recess comprising a member having a pointed ejecting surface which scatters seed expelled from the recesses.

12. In a seed sowing machine comprising a storage container for seed, an ejection duct, and a seed sowing unit operable during movement of the machine for sowing to transfer seed from the container to the ejection duct and said seed sowing unit including a removable shell having a circumferential row of seed recesses opening into the outer periphery thereof, an ejecting member displaceable within each recess comprising a member having pockets therein for receiving and ejecting seed through the recesses.

13. In a seed sowing machine comprising a storage container for seed, an ejection duct, and a seed sowing unit operable during movement of the machine for sowing to transfer seed from the container to the ejection duct and said seed sowing unit including a removable shell having a circumferential row of seed recesses opening into the outer periphery thereof, an ejecting member displaceable within each recess comprising a member having a number of longitudinal projections remote from the head of said member for loosening seed during expulsion from the recess into the ejection duct.

References Cited by the Examiner

UNITED STATES PATENTS

| | | | |
|---|---|---|---|
| 451,761 | 5/91 | Howland | 222—218 |
| 709,793 | 9/02 | McGinnity | 222—218 |
| 969,918 | 9/10 | Streitz | 222—318 |
| 2,374,132 | 4/45 | Radde et al. | 222—218 |
| 3,053,418 | 9/62 | Jordan | 222—219 X |

LOUIS J. DEMBO, *Primary Examiner.*

HADD S. LANE, *Examiner.*